United States Patent Office 3,226,352
Patented Dec. 28, 1965

3,226,352
ETHYLENE POLYMERIZATION IN NONIONIC EMULSION SYSTEMS
Arthur F. Helin and Gerald J. Mantell, Kansas City, Mo., assignors to Gulf Oil Corporation, Pittsburgh, Pa., a corporation of Pennsylvania
No Drawing. Continuation of application Ser. No. 44,862, July 25, 1960. This application Dec. 24, 1964, Ser. No. 421,100
6 Claims. (Cl. 260—29.6)

This application is a continuation of our copending application, S.N. 44,862, filed July 25, 1960, now abandoned.

This invention relates to emulsions of polymeric materials. More particularly, this invention is concerned with novel stable aqueous nonionic emulsions of polyethylene, processes of producing the same, and novel polyethylene products.

Polyethylene finds many important uses because of its desirable physical and chemical properties. Included within such uses is the employment of polyethylene as a surface coating. The polyethylene is applied to surfaces in several ways including extrusion, gluing and in the form of emulsions. Polyethylene emulsions heretofore available have not been especially satisfactory because of poor stability, difficulty in manufacture and low solids content.

According to the present invention there are provided novel polyethylene emulsions in water characterized by good stability and which are odorless, colorless, milky, low viscosity liquids.

The novel polyethylene emulsions of this invention are produced by polymerizing ethylene in an aqueous medium under suitable polymerization inducing temperatures and pressures with a polymerization initiator and in the presence of a nonionic alkylphenoxy polyoxyethylene ethanol emulsifier of the formula

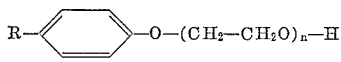

wherein R is an alkyl chain having 8 or 9 carbons, advisably branched such as a polypropylene or polybutylene chain and $n$ represents an average of 7 to about 15. Surprisingly, many other emulsifiers which were tried, including similar structures, did not work at all or gave emulsions of low solid content or partial stability.

Some of the emulsifiers that can be used in the process are Triton X–100 of the formula

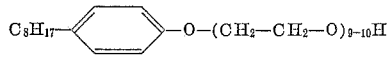

Triton X–114 of the formula

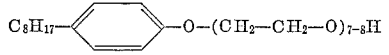

Triton N–101 of the formula

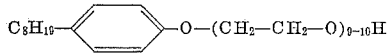

Triton N–128 of the formula

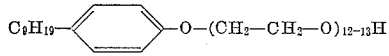

Tergitol NPX of the formula

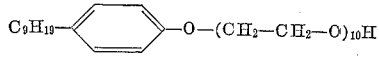

and Igepal CO–730 of the formula

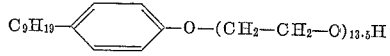

The amount of emulsifier included in the reaction mixture is not narrowly critical but will depend somewhat upon the extent to which the polymerization is carried, viz., the amount of polyethylene formed. Thus, more emulsifier should be employed when the polymerization is conducted to produce an emulsion of 20 to 25% solids content than when the solids content is say 15 to 20% Irrespective of the extent of the polymerization, however, an amount of emulsifier is advisably used to constitute about 5 to 20%, and advisably, 10 to 15%, by weight of the solids content in the resulting latex or emulsion. In general, about 1 to 5% weight of emulsifier based upon the weight of liquid medium can be used for the polymerization.

Although the polymerization can be readily effected in the presence of water as the sole liquid medium, it is advisable to include an alcohol such as t-butanol therein. Such aqueous-alcoholic medium can contain any amount of an alcohol of a type which favorably influences the polymerization and the resulting emulsion. Thus, up to about 35% by weight, based on the combined weight of alcohol and water, of an alcohol such as t-butanol can be acceptably included in the polymerization medium with about 7 to 25% by weight being most suitable.

The polymerization is conveniently effected at temperatures of about 60 to 150° C., with a temperature in the range of 70 to 120° C. advisably used. Presently, the preferred initiation temperature is less than about 100° C. and advisably about 80° C., with the polymerization then being completed at a higher temperature such as about 100–120° C. or above. Pressures from about 2000 p.s.i. to 20,000 p.s.i. and higher can be used; however, pressures of about 2500 to 4500 p.s.i. are particularly suitable for producing the emulsions. It is to be understood, however, that particular temperature-pressure relationships are to be used which give the desired stable aqueous latex and not conditions which might pervert this objective.

Conventional polymerization initiators of the water-soluble persulfate class such as alkali metal persulfates including potassium or sodium persulfate and other water-soluble persulfates, e.g., ammonium persulfates and the like can be used. Generally from 0.08% to 0.50% by weight of initiator based on the liquid reaction medium is adequate for the polymerization.

The polymerization can be effected batchwise. In a batchwise operation, the liquid reaction medium is added to an autoclave together with the nonionic emulsifier. The autoclave is advisably equipped with a stirrer or agitator. After purging the autoclave, such as with ethylene, the charge is heated to the polymerization temperature and then the ethylene pressure is raised to that to be used for the polymerization. While the mixture is agitated a solution of the initiator in water is pumped in. As the polymerization proceeds, additional ethylene is continuously fed in to maintain the pressure. The polymerization is permitted to proceed until the emulsion reaches the desired solids content. This can be determined by periodically withdrawing samples from the autoclave as the polymerization progresses. The polymerization is generally sufficiently far along in about 2 to 5 hours to yield an emulsion of the desired solids content. The emulsion produced directly in the polymerization should generally have a minimum of about 14% solids by weight for practical reasons but usually not over 25% solids by weight since higher concentrations lead to emulsions of lowered stability and prefloc or unemulsified polyethylene. A latex with a solids content of about 17 to 22% is considered best. In any event the polymerization advisably should be terminated when the total solids contain about 10 to 15% by weight of the nonionic emulsifier. The polymer particle size will usually be of the range of 0.03 to 0.15 microns.

Following the polymerization any solvent present such as t-butanol can be stripped from the latex and the latex concentrated by distillation under reduced pressure until the solids content is up to 30 to 50%, without adverse effect on the stability of the emulsion.

The polyethylene resin can be isolated from the emulsion by suitable coagulating techniques such as by the use of isopropanol containing a small amount of concentrated hydrochloric acid. The precipitated polymer can be filtered and washed with isopropanol and water. The polyethylene so obtained will generally have a density of at least 0.928 and a softening point above 100° C.

It has been found that the novel emulsions produced according to this invention contain novel modified polyethylene resins comprising the emulsifier linked chemically to polyethylene chains. It is believed that the emulsifier functions to a limited extent as a chain transfer agent with emulsifier radicals forming end groups on polyethylene chains. The presence of the polyethylene-emulsifier resin is established by concentrating an emulsion produced according to this invention to dryness and repeatedly extracting the solids, as with methanol, ethanol and then hexane. Thus, an emulsion containing solids having 16% Triton N-101 (on solids) lost 14.4% (on solids) of the emulsifier upon extraction with methanol but after leaching with ethanol and n-hexane the polyethylene contained 0.74% Triton N-101. This was after a total extraction time of 370 hours. Solution and reprecipitation of the polyethylene did not remove the emulsifier. The amount of emulsifier combined with polyethylene is considerably higher than that present after the ethanol and n-hexane extractions because these solvents extract low molecular weight polyethylene as well as the emulsifier.

In general, up to about 3 to 4% by weight of the total solids in the emulsion usually constitutes emulsifier bonded to polyethylene chains although the amount will, of course, vary according to the extent to which the polymerization is carried and the amount of emulsifier used. The emulsifier modified polyethylene resin will usually constitute about 20 to 25% by weight of the total solids content.

The novel emulsions provided by this invention form adherent, tough, glossy films on paper (110–120° C.) which have good moisture vapor barrier properties. Thin films on smooth surfaces are hard, tough, glossy, adherent, non-smearing coatings. The emulsions are useful in textile finishing, polishes, printing inks, surface coatings, as for example, paints and industrial finishes.

The following examples are presented to illustrate the invention.

*Example 1*

To a mixture of 72 lbs. of distilled water and 13.5 lbs. of t-butanol was added 2.7 lbs. of "Triton" N-101 in a 15 gallon mixing tank. The stirred mixture was pumped into an 18 gallon autoclave equipped with two 5-inch propellor-type agitators. The autoclave was purged with ethylene (agitator off) and the charge was heated to 80° C. with the agitator rotating at 654 r.p.m. Ethylene supplied from a compressor was pumped in until the pressure reached 2500 p.s.i.g. At this time an initiator solution containing 0.22 lb. of potassium persulfate in 4.5 lbs. of distilled water was pumped into the autoclave. The ethylene pressure was adjusted to 3000 p.s.i.g. and maintained there by an automatic control system. During the course of 4½ hours small samples were removed periodically and solids content determined. The ethylene feed was discontinued when the solids content reached 17.4%. The product was discharged into a receiving vessel at atmospheric pressure. The product was a smooth, white latex of uniform consistency containing no undispersed solid polymer. The latex pH was 2.5. The particle size was approximately 0.05 to 0.1 microns as determined by an electron micrograph.

Part of the product was stripped of butanol and concentrated in a 22-liter rotating flask at reduced pressure in a heated bath. The final total solids content was 41.8%. Little or no separation of solids occurred during these operations. The concentrated latex was stable to acids, bases, polyvalent metal cations and vigorous mechanical agitation.

A portion of the unstripped latex was coagulated by addition to three times its volume of isopropanol containing 1.6% by volume of concentrated hydrochloric acid. The mixture was heated to 60° C., cooled and filtered with suction. The filter cake was reslurried in a volume of distilled water equal to 84% of the isopropanol used in the first step and refiltered. The pressed filter cake was dried in a vacuum oven at 50° C. The polymer thus isolated was a white powder having the following properties:

Inherent viscosity (0.1 g. in 50 cc. of tetralin at 135° C.)—0.642
Melt index—475 at 190° C.
Density—0.93
Ring and ball softening point—105–106° C.

An infrared spectrum of a molded film had absorption bands at 6.2, 6.6 and 9.0 microns corresponding to bands present in Triton N-101. These bands were not removed by extraction with boiling methanol for 15 minutes or at room temperature for 69.5 hours, thus demonstrating that the Triton N-101 combined with the polymer to the extent of 3% by weight of the product.

*Example 2*

To 1600 g. of water was added 57 g. of Triton X-305 (70% active) and to this solution was added 300 g. of t-butanol. The solution was placed in a 1-gallon Magne Dash autoclave which was sealed, evacuated, purged twice with ethylene at 200 lb./sq. in. and filled with ethylene to a pressure of 1000 lb./sq. in. The agitator was started and the temperature was increased to 80° C. A solution of 3.8 g. of potassium persulfate in 76.2 g. of water was added and the pressure was adjusted to 3000 lb./sq. in. After ½ hour, 0.95 g. of potassium persulfate in 19 g. of water was added and this was repeated at 2 hours and at 2½ hours. After 5 hours the reaction was terminated. The product remaining was a white latex containing 19.1% total solids.

*Example 3*

A 60 g. portion of Triton X-100 was dissolved in 1600 g. of water and 300 g. of t-butanol was added. The solution was placed in a 1-gallon Magne Dash autoclave which was sealed, evacuated, purged twice with ethylene at 200 lb./sq. in. and filled with ethylene to a pressure of 1000 lb./sq. in. The agitator was started and the vessel was heated to 80° C. A solution of 3.8 g. of potassium persulfate in 76.2 g. of water was added and the pressure was adjusted to 3000 lb./sq. in. After about 1 hour a solution of 0.95 g. of potassium persulfate in 19 g. of water was added and this was repeated at 3½, 4½, 5½ and 9 hours. After 10 hours the reaction was terminated. The product was a white latex containing 18.4% total solids. The latex was stripped of butanol and concentrated to 34% total solids by vacuum distillation. The polymer isolated from this latex had an inherent viscosity of 0.916, melt index of 18, and density of 0.9341.

*Example 4*

An 80 gram portion of Triton X–100 was dissolved in 1900 g. of distilled water and the solution was placed in a 1-gallon Magne-Dash autoclave. The autoclave was sealed, evacuated, and purged by flushing twice with ethylene at 200 lb./sq. in. and filled with ethylene to a pressure of 900 lb./sq. in. The agitator was started and the temperature was raised to 100° C. A solution of 4.8 g. of potassium persulfate in 95.2 g. of water was added and the pressure was adjusted to 4500 lb./sq. in. After 2¼ hrs., 1.2 g. of potassium persulfate in 23.8 g. of water was added. Ethylene was added as required to maintain 4200–4500 lb./sq. in. pressure. After 6¾ hours the reaction was terminated. The product was a white latex containing 13.7% total solids.

*Example 5*

A 60 g. portion of Triton X–114 was added to 1600 g. of distilled water and 300 g. of t-butanol was added to this solution. The solution was placed in a 1-gallon Magne Dash autoclave which was sealed, evacuated, purged twice with ethylene at 200 lb./sq. in. and filled with ethylene to a pressure of 1000 lb./sq. in. The agitator was started and the temperature was increased to 80° C. A solution of 4.8 g. of potassium persulfate in 95.2 g. of water was added and the pressure was adjusted to 3000 lb./sq. in. After ½ hour, 1.2 g. of potassium persulfate dissolved in 23.8 g. of water was added and this was repeated at 4, 6.3, and 7.1 hours. After 8 hours the reaction was terminated. The product was a white latex containing 14.8% total solids. The latex was stripped of butanol and concentrated to 22.5% total solids by vacuum distillation. The polymer isolated from this latex had an inherent viscosity of 0.725 with some insoluble material present and a density of 0.9327 g./ml.

*Example 6*

A 60 g. portion of Tergitol NPX was added to 1600 g. of distilled water and 300 g. of t-butanol was added to the solution. The solution was placed in a 1-gallon Magne Dash autoclave which was sealed, evacuated, purged twice with ethylene at 200 lb./sq. in. and filled with ethylene to a pressure of 1000 lb./sq. in. The agitator was started and the vessel was heated to 80° C. A solution of 4.8 g. of potassium persulfate in 95.2 g. of water was added and the pressure was adjusted to 3000 lb./sq. in. After 1 hour, 1.2 g. of potassium persulfate dissolved in 23.8 g. of water was added and this was repeated at 5.4 hours and 7.3 hours. After 8 hours the reaction was terminated. The product was a latex containing 17.0% total solids. A large amount of prefloc was present in the reactor. The weight of the washed and dried prefloc was 122 g. The polymerization was obviously carried beyond the point where there was sufficient emulsifier present to stabilize the polymer.

*Example 7*

A 60 g. portion of Igepal CO–730 was dissolved in 1600 g. of distilled water and 300 g. of t-butanol was added. The solution was placed in a 1-gallon Magne Dash autoclave which was sealed, evacuated, purged twice with ethylene at 200 lb./sq. in. and filled with ethylene to a pressure of 1000 lb./sq. in. The agitator was started and the vessel was heated to 80° C. A solution of 4.8 g. of potassium persulfate in 95.2 g. of water was added and the pressure was adjusted to 3000 lb./sq. in. After 5.2 hours the reaction was terminated. The product was a smooth white latex containing 15.3% total solids. A portion of the latex was stripped of butanol and concentrated to 22.4% total solids by vacuum distillation. The polymer isolated from this latex had an inherent viscosity of 0.716, a melt index of 460, a density of 0.9421 and a melting point of 99–103° C.

*Example 8*

The general procedure of Example 3 was followed except that the emulsifier was Triton N–101 and the quantity of alcohol was varied. The quantity of water was adjusted correspondingly to provide 100 parts total by weight of alcohol plus water in all runs. The following results were obtained.

| Run | Parts t-butanol | Reaction Time, Hr. | Final Total Solids, percent | Polymerization Rate Parts/hr. | Polymer Inherent Viscosity |
|---|---|---|---|---|---|
| 1 | 7.5 | 7.5 | 17.0 | 1.9 | 0.440 |
| 2 | 22.5 | 7.5 | 23.4 | 2.8 | 0.716 |
| 3 | 30 | 3.3 | 17.2 | 4.4 | 0.850 |

These results show that the reaction rate, as well as the molecular weight of the polymer, go up as the amount of t-butanol is raised.

Various changes and modifications of the invention can be made and, to the extent that such variations incorporate the spirit of this invention, they are intended to be included wihin the scope of the appended claims.

We claim:

1. The method of preparing a stable aqueous emulsion of polyethylene in one step comprising polymerizing ethylene in an aqueous medium containing dissolved therein a water soluble persulfate polymerization initiator and an emulsifying agent consisting essentially of a non-ionic compound of the formula

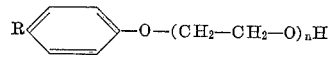

wherein R represents an alkyl group having 8 to 9 carbon atoms and wherein $n$ is an average number of from 7 to 15, said resulting emulsion comprising:
   (a) a continuous aqueous phase;
   (b) said non-ionic compound and
   (c) a plurality of polyethylene particles, at least a portion of the polyethylene in said particles being modified by chemical combination with said non-ionic compound.

2. Method of claim 1 wherein said initiator is an alkali metal persulfate.

3. Method of claim 1 wherein said non-ionic compound is

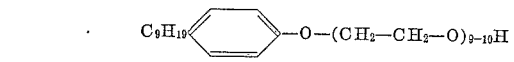

4. Method of claim 1 in which t-butanol is present in said aqueous medium.

5. The method of preparing a stable aqueous emulsion of polyethylene in one step comprising intimately contacting ethylene with from 0.08 to 0.50% by weight of a water soluble alkali metal persulfate polymerization initiator, said initiator being dissolved in an aqueous medium consisting essentially of water, about 7 to 25% by weight of t-butanol and about 1 to 5% by weight of a non-ionic compound of the formula

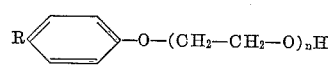

wherein R represents an alkyl group having 8 to 9 carbon atoms and wherein $n$ is an average number of from 7 to 15, said contacting being carried out with agitation at a pressure of about 2,000 to 20,000 p.s.i. and a temperature of about 60 to 150° C. until the solids content of said emulsion is about 15 to 25% by weight of the emulsion, said resulting emulsion comprising:
  (a) a continuous aqueous phase;
  (b) said non-ionic compound; and
  (c) a plurality of polyethylene particles, at least a portion of the polyethylene in said particles being modified by chemical combination with said non-ionic compound.

6. A method of claim 5 wherein said emulsion is thereafter stripped of t-butanol and water to yield an emulsion product containing up to about 50 weight percent solids.

References Cited by the Examiner
UNITED STATES PATENTS

| | | | |
|---|---|---|---|
| 2,449,489 | 9/1948 | Larson | 260—29.6 |
| 2,592,526 | 4/1952 | Seed | 260—94.9 |
| 2,728,755 | 12/1955 | Weiseman | 260—29.6 |

MURRAY TILLMAN, *Primary Examiner.*

N. F. OBLON, *Assistant Examiner.*